United States Patent [19]

Sperl et al.

[11] Patent Number: 5,044,435
[45] Date of Patent: Sep. 3, 1991

[54] ENHANCED OIL RECOVERY USING DENITRIFYING MICROORGANISMS

[75] Inventors: George T. Sperl; Penny L. Sperl, both of Bartlesville, Okla.

[73] Assignee: Injectech, Inc., Ochelata, Okla.

[21] Appl. No.: 552,709

[22] Filed: Jul. 16, 1990

[51] Int. Cl.$^5$ .................. E21B 43/22; E21B 43/27
[52] U.S. Cl. ........................ 166/246; 166/270; 166/271; 166/300; 166/307; 435/281; 435/282
[58] Field of Search .............. 166/246, 270, 271, 300, 166/307; 435/281, 282, 252.1

[56] References Cited

U.S. PATENT DOCUMENTS

| | | | |
|---|---|---|---|
| 2,413,278 | 12/1946 | Zobell | 166/246 X |
| 3,542,431 | 11/1970 | Johnson et al. | 166/246 X |
| 3,937,520 | 2/1976 | Sievert | 166/246 X |
| 3,982,995 | 9/1976 | Yen et al. | 166/246 X |
| 4,905,761 | 3/1990 | Bryant | 166/246 |

FOREIGN PATENT DOCUMENTS 910807  9/1972  Canada ....................... 166/246

OTHER PUBLICATIONS

Kuenen et al., "The Genera Thiobacillus and Thiomicrospira", (Springer-Verlag), vol. 1, Part 2, pp. 1023–1036.

*Primary Examiner*—George A. Suchfield
*Attorney, Agent, or Firm*—Foley & Lardner

[57] ABSTRACT

A method of microbial enhanced oil recovery includes introducing, into an underground carbonate-containing rock formation that defines an anaerobic environment, denitrifying microorganisms, water, and a source of nitrate ion. The microorganisms reduce the nitrate and produce sulfuric acid which dissolves the rock formation, releasing oil. The microorganisms can be denitrifying Thiobacilli, such as *T. denitrificans*.

36 Claims, 1 Drawing Sheet

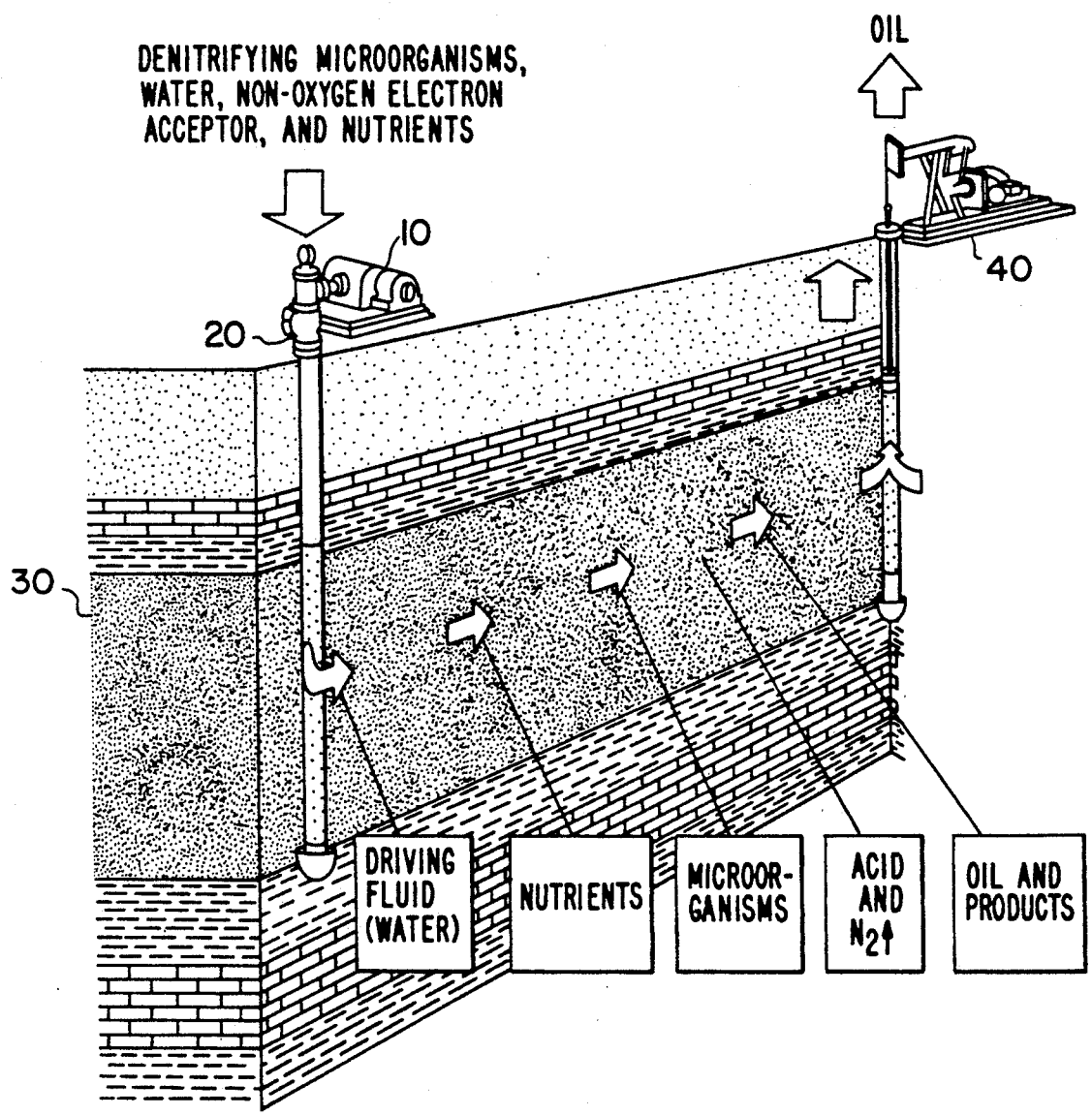

ENHANCED OIL RECOVERY USING DENITRIFYING MICROORGANISMS

BACKGROUND OF THE INVENTION

The present invention relates to microbial enhanced oil recovery (MEOR) based on the use of denitrifying microorganisms.

Petroleum is recovered from underground oil-bearing rock formations by penetrating a rock formation with one or more wells and collecting the oil at the surface. If sufficient pressure exists in the underground oil-bearing rock formations, the oil is forced to the surface by the pressure without the need for a pump. Frequently, as a reservoir becomes depleted, the pressure in the reservoir decreases to the point where pumping is required.

Unfortunately, much of the oil in underground rock formations is contained in pockets which are isolated from the space being accessed by a well bore. Oil contained in isolated pockets is difficult to recover by conventional methods, such as drilling additional well bores to access these pockets.

At the present time, the average recovery of oil from an underground reservoir ranges from 10% to 50% with an average of about 33%. Since an estimated 67% of the United States' oil reserves are still in the ground and not recoverable using current technology, the ability to efficiently recover even 1% of the oil trapped in pockets would result in significant economic benefits and would decrease the United States' dependence on foreign oil. There is still an estimated $35 \times 10^{10}$ barrels of oil left in "exhausted" United States oil fields, not including oil shale. Approximately 15-40% of the oil contained in "exhausted" oil fields is in rock formations containing significant amounts of carbonate.

Accordingly, there is a need for a practical method of recovering oil from underground rock formations which contain oil in isolated pockets.

SUMMARY OF THE INVENTION

It is an object of the instant invention, therefore, to provide a practical method of recovering oil from underground rock formations which contain oil in isolated pockets.

It is another object of the invention to provide a method of increasing the pressure of oil in underground reservoirs to assist oil recovery.

It is another object of the invention to provide a method of enhanced oil recovery which is effective in an underground, anaerobic environment.

An aspect of the invention provides a method of microbial enhanced oil recovery, including the step of introducing, into a carbonate-containing rock formation that defines an anaerobic environment, (a) denitrifying microorganisms, (b) an aqueous liquid carrier and (c) a non-oxygen electron acceptor, such that the microorganisms reduce the non-oxygen electron acceptor in the presence of a sulfur-containing compound and produce sulfuric acid which dissolves carbonate in the rock formation. In a preferred embodiment of the invention, the microorganisms are denitrifying Thiobacilli, such as *T. denitrificans*, and the non-oxygen electron acceptor is a source of nitrate ion, such as ammonium nitrate.

The reduction of nitrate also produces nitrogen gas which pressurizes oil in the rock formation, which assists in removal of the oil from the rock formation. The dissolution of the carbonate-containing rock formation buffers the mixture of the microorganisms, the aqueous liquid carrier, and the source of nitrate ion at a pH of approximately 6.5, which is the optimum pH for growth of the *T. denitrificans*.

BRIEF DESCRIPTION OF THE DRAWING

The present invention will be described in further detail below in conjunction with FIG. 1, a line drawing which shows an apparatus for performing MEOR in accordance with a preferred embodiment of the present invention.

DETAILED DESCRIPTION OF THE PREFERRED EMBODIMENTS

Oil is frequently present in underground, carbonate-based formations, for example, in limestone formations. Much of the oil in these formations is contained in pockets which are isolated, by carbonate-containing rock, from the space accessible to a well bore. It has been discovered, however, that dissolution of the carbonate-containing rock with acid allows these pockets to coalesce, so that trapped oil can be efficiently withdrawn. This coalescing increases the recovery of oil from reservoirs conventionally deemed to depleted.

In accordance with the present invention, acid is produced in situ by the use of microorganisms, such as bacteria of the genus , which are capable of generating acid. Thiobacilli and other acid-producing microbes have not been considered for a MEOR process because they were understood to be aerobic, i.e., to require oxygen as an electron accepter, and therefore to be ill-suited for survival in the anaerobic environment of an oil well.

It has been discovered, however, that employing a non-oxygen electron accepter, such as nitrate, nitrite, nitric oxide, or nitrous oxide, permits the use of acid-producing microbes like Thiobacilli to condition subterranean formations in a MEOR process. Thus, the present invention provides a method of microbial enhanced oil recovery which entails introducing, into an underground rock formation which defines an anaerobic environment, acid-producing microorganisms and a non-oxygen electron accepter. The microorganisms reduce the non-oxygen electron accepter and produce acid which dissolves portions of the rock formation, thus permitting isolated pockets of oil to coalesce.

The instant invention is particularly effective in enhancing oil recovery from carbonate-containing formations, including limestone and mixed limestone-sandstone formations. The invention can also be employed in conditioning underground shale-limestone formations, although effectiveness will depend to some extent on rock permeability.

A variety of microorganisms can be employed, in accordance with the present invention, to produce acid for dissolving carbonate in a subterranean formation. In a preferred embodiment, denitrifying Thiobacilli are employed. For a discussion of Thiobacilli see Kuenen and Tuovinen in THE PROKARYOTES (Springer-Verlag), Volume 1 (part 2), at pages 1023-36, the contents of which are hereby incorporated by reference. Illustrative of the many denitrifying Thiobacillus species suitable for this purpose is *T. denitrificans*. As indicated by Kuenen and Tuovinen at pages 1023-36, *T. thioparus* may also denitrify and, hence, should be a suitable microorganism for the present invention.

Other, similarly denitrifying microorganisms should also be useable in the instant invention.

Table 1 lists the ingredients for a medium supporting normal growth of laboratory strains of *T. denitrificans*. Table 2 lists the ingredients for the trace metal solution listed in Table 1. The trace metal solution provides the necessary nutrients to satisfy trace element requirements for B, Zn, Cu, Co, Mn, Fe, Mo, W, Ni, and Se for the denitrifying microorganisms.

TABLE 1

Medium for normal growth of laboratory strains of *T. denitrificans*
Medium 1

| Ingredient | g/l |
|---|---|
| $Na_2S_2O_3.5H_2O$ | 5.0 |
| $NH_4Cl$ | 1.0 |
| $KNO_3$ | 2.0 |
| $KH_2PO_4$ | 2.0 |
| $NaHCO_3$ | 2.0 |
| $MgSO_4.7H_2O$ | 0.8 |
| $FeSO_4.7H_2O$ | 0.02 |
| Trace Metal Solution | 1 ml |
| adjust pH to 6.5 | |

TABLE 2

Trace Metal Solution

| Ingredient | g/l |
|---|---|
| EDTA | 50 |
| $H_3BO_3$ | 3.0 |
| $ZnSO_4.7H_2O$ | 22 |
| $CaCl_2$ | 5.5 |
| $MnCl_2.4H_2O$ | 5.1 |
| $FeSO_4.7H_2O$ | 5.0 |
| $Na_2MoO_4.2H_2O$ | 1.0 |
| $Na_2WO_4.2H_2O$ | 1.0 |
| $Na_2SeO_3.5H_2O$ | 1.0 |
| $CuSO_4.5H_2O$ | 1.6 |
| $CoCl_2.6H_2O$ | 1.6 |
| $NiCl_2.6H_2O$ | 1.0 |
| adjust pH to 6.0 with KOH | |

Underground oil reservoirs are frequently flooded with water after the reservoirs have become significantly depleted in order to supply additional pressure to assist oil recovery. Microorganisms and a non-oxygen electron accepter used pursuant to the present invention can be injected into a well with this flood water. The flood water in this instance acts as an aqueous liquid carrier. Alternatively, the microorganisms and the non-oxygen electron accepter can be injected into a well separately from the flood water. In this later case, another aqueous liquid, that is, a liquid other than the flood water, is provided to serve as a carrier.

FIG. 1 illustrates an apparatus for performing MEOR according to a preferred embodiment of the instant invention. In FIG. 1, an injection pump 10 injects a mixture of denitrifying microorganisms, water, non-oxygen electron accepters, and nutrients into carbonate-containing rock 30 via injection well 20. As will be described in further detail below, the microorganisms produce sulfuric acid which dissolves the carbonate, thereby releasing oil which is then withdrawn by pump 40. The microorganisms also produce nitrogen gas which pressurizes the rock formation, which assists oil recovery.

Table 3 lists the ingredients of a medium for demonstrating the actual dissolution of crushed limestone in a laboratory simulation.

TABLE 3

Medium for demonstrating the actual dissolution of limestone.
Medium 2

| Ingredient | g/l |
|---|---|
| Microorganisms | |
| Reduced sulfur source* | 5.0 |
| $NH_4NO_3$ | 2.5 |
| $KH_2PO_4$ | 0.1 |
| Limestone | 2.5 |
| Water | 1000 ml |

*May be $Na_2S$, $Na_2S_2O_3$, $S''$, $Na_2S_4O_6$, $H_2S$, $SO_3^=$ or $SCN^-$.

The medium described by Table 3 includes the microorganisms, a reduced sulfur source, ammonium nitrate, potassium dihydrogenphosphate, limestone, or carbonate, and water. The reduced sulfur source serves as an energy source for the microorganisms and serves as a reactant for producing sulfuric acid which dissolves the limestone. In addition to elemental sulfur, any of the following sulfur-containing compounds can serve as a sulfur source: $Na_2S$, $Na_2S_2O_3$, $Na_2S_4O_6$, $H_2S$, $SO_3^=$ and $SCN^-$.

Ammonium nitrate serves as an electron accepter and as a nitrogen source for the microorganisms. The nitrate is reduced to form nitrogen gas during the production of the sulfuric acid. As previously mentioned, the nitrogen gas enhances oil recovery by pressurizing the rock formation. Alternatively, a source of nitrite ions, nitric oxide, or nitrous oxide can be used as the non-oxygen electron accepter. The nitric oxide and nitrous oxide are added as a gas dissolved in the aqueous liquid carrier.

A small amount of a phosphate compound is typically provided to satisfy phosphate requirements of the microorganisms. The amount of phosphate compound added should just satisfy the nutritional phosphate requirements of the microorganisms. If too much phosphate compound is added, the buffering capacity of the phosphate compound may interfere with dissolution of the limestone.

When the limestone is dissolved, carbon dioxide is produced. This carbon dioxide provides a source of $CO_2$, which is necessary for growth of the microorganisms. The carbon dioxide and carbonate ($CO_3^=$) are in chemical equilibrium, as expressed by the following equation:

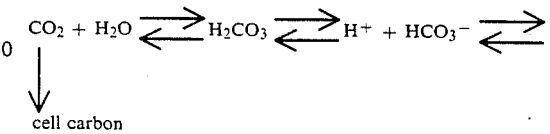

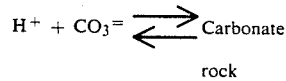

The dissolution of the carbonate provides four additional benefits which enhance oil recovery. First, the dissolution of the carbonate buffers the mixture of the microorganisms, the water, and the nitrate ions at a constant pH of approximately 6.5, which is the optimum pH for growth of microbes like *T. denitrificans*. Second, the sulfuric acid is neutralized by dissolution of the limestone. Third, because the microorganisms remove carbon dioxide from the mixture to form cellular carbon, as indicated in the above equation, dissolution of the limestone occurs not only due to reaction of the limestone with the acid, but also due to production of carbon dioxide necessary to maintain the equilibrium. In other words, every time a carbon is integrated into cellular carbon, another carbonate is brought into solution. Fourth, the production of carbon dioxide gas increases the pressure of oil in the well, thus further assisting oil recovery.

Some wells may already contain enough sulfide, if the well is sour, to satisfy sulfur requirements. Most brines contain a high enough concentration of trace metals to satisfy trace metal requirements for typical denitrifying microorganisms. Therefore, under ideal conditions, the ingredients which are required to be injected into the well are ammonium nitrate, phosphate, and the microorganisms.

Under less than ideal conditions, a reduced sulfur source and metal nutrients, in very low concentrations, may have to be injected into the well.

The amount of limestone dissolved is not critical, since merely opening a new channel for oil and water flow could have significant effects. In addition to causing pressurization and limestone dissolution, the microorganisms also selectively plug well-washed channels, which allows dissolution of additional channels.

Tables 4 through 7 list the dissolution of crushed and solid limestone using various microorganisms and various energy sources. The microbes employed in the examples detailed in these tables were *T. denitrificans* strains deposited with the American Type Culture Collection (Rockville, Md.) under accession numbers ATCC 25259 and ATCC 23642, as well as wild isolates, including moderately thermophilic isolates. The table entries labeled "Buck Tail" and "Meadow Creek" list dissolution which occurred using samples of water, taken at these locations in Idaho, that contain indigenous denitrifying microbes.

Table 4 also lists the dissolution which resulted when using 1N hydrochloric acid, instead of acid produced microbially, to dissolve the limestone. From the dissolution obtained using the hydrochloric acid, it appears that about 12–17% of the limestone sample was composed of acid-insoluble material.

TABLE 4

Dissolution of crushed (≧100 mesh) limestone in Medium 2 with thiosulfate ($S_2O_3^=$) as the energy source.

| Strain | % Dissolved |
|---|---|
| ATCC 25259 | 88.3 |
| ATCC 23642 | 82.9 |
| Buck Tail | 85.0 |
| Meadow Creek | 86.1 |
| 1 N HCl | 87.4 |

TABLE 5

Dissolution of solid limestone in Medium 2 with thiosulfate ($S_2O_3^=$) as the energy source.

| Strain | mg/l Dissolved |
|---|---|
| ATCC 25259 | 740 |
| ATCC 23642 | 760 |
| Buck Tail | 723 |
| Meadow Creek | 635 |

TABLE 6

Dissolution of solid limestone in Medium 2 with sulfur, $S^0$, as the energy source.

| Strain | mg/l Dissolved |
|---|---|
| ATCC 25259 | 380 |
| ATCC 23642 | 320 |
| Buck Tail | 370 |
| Meadow Creek | 330 |

TABLE 7

Dissolution of solid limestone in Medium 2 with sulfide, $Na_2S$, as the energy source.

| Strain | mg/l Dissolved |
|---|---|
| ATCC 25259 | 60 |
| ATCC 23642 | 160 |
| Buck Tail | 30 |
| Meadow Creek | 35 |

With optimization of culture conditions, nutrient concentrations, other physical attributes of the cultures, and the like, about one gram of limestone can be dissolved by *T. denitrificans* per liter of culture. An average water flood injects 15,000 liters of water per day into a rock formation. This means that approximately 15 kg of limestone can be dissolved per day in a typical well. This dissolution is equivalent to 2 to 3 tons of carbonate dissolution per year, illustrating the utility of MEOR according to the present invention.

While the present invention has been described with reference to certain preferred embodiments, it is understood that various modifications and improvements may be made by those skilled in the art without departing from the scope of the present invention as defined by the appended claims.

What is claimed is:

1. A method of microbial enhanced oil recovery, comprising the step of introducing, into a carbonate-containing rock formation that defines an anaerobic environment, (a) denitrifying microorganisms, (b) an aqueous liquid carrier and (c) a non-oxygen electron accepter, such that said microorganisms reduce said non-oxygen electron accepter in the presence of a sulfur-containing compound and produce sulfuric acid, which dissolves carbonate in said rock formation to release oil.

2. A method according to claim 1, wherein said non-oxygen electron accepter is selected from the group consisting of a source of nitrate ion, a source of nitrite ion, nitric oxide, and nitrous oxide.

3. A method according to claim 2, wherein said non-oxygen electron accepter is a source of nitrate ion.

4. A method according to claim 3, wherein said rock formation contains said sulfur-containing compound.

5. A method according to claim 3, further comprising the step of introducing said sulfur-containing compound into said rock formation, wherein said sulfur-containing compound is selected from the group consisting of sulfur, a thiosulfate compound, a tetrathionate compound and a sulfide compound.

6. A method according to claim 3, wherein said microorganisms are denitrifying Thiobacilli.

7. A method according to claim 6, wherein said microorganisms are of the species *T. denitrificans*.

8. A method according to claim 3, further comprising the step of introducing, into said rock formation, a phosphate compound in an amount sufficient to satisfy a nutritional phosphate requirement for said microorganisms.

9. A method according to claim 3, wherein flood water serves as said aqueous liquid carrier.

10. A method according to claim 3, wherein said step of introducing comprises injecting, into said rock formation, a composition containing said microorganisms, said source of nitrate ion, and said aqueous liquid carrier separately from injecting, into said rock formation, flood water.

11. A method according to claim 3, wherein said carbonate-containing rock formation is a limestone formation.

12. A method according to claim 3, Wherein said carbonate-containing rock formation is a mixed limestone-sandstone formation.

13. A method according to claim 3, wherein said carbonate-containing rock formation is a shale-limestone formation.

14. A method according to claim 3, further comprising the step of introducing, into said rock formation, metal nutrients in amounts sufficient to satisfy metal nutrient requirements for said microorganisms.

15. A method according to claim 3, further comprising the step of introducing, into said rock formation, a nitrogen source.

16. A method according to claim 3, wherein reduction of said nitrate produces nitrogen gas which pressurizes oil in said rock formation, said pressurization assisting removal of said oil from said rock formation.

17. A method according to claim 3, wherein said carbonate is in chemical equilibrium with carbon dioxide and wherein said microorganisms remove said carbon dioxide, causing further dissolution of carbonate in order to maintain chemical equilibrium.

18. A method according to claim 1, wherein said rock formation contains said sulfur-containing compound.

19. A method according to claim 1, further comprising the step of introducing said sulfur-containing compound into said rock formation, wherein said sulfur-containing compound is selected from the group consisting of sulfur, a thiosulfate compound, a tetrathionate compound and a sulfide compound.

20. A method according to claim 1, wherein said microorganisms are denitrifying Thiobacilli.

21. A method according to claim 20, wherein said microorganisms are of the species *T. thioparus.*

22. A method according to claim 20, wherein said microorganisms are of the species *T. denitrificans.*

23. A method according to claim 22, wherein said microorganisms are of the strain *T. denitrificans* ATCC 25259.

24. A method according to claim 22, wherein said microorganisms are of the strain *T. denitrificans* ATCC 23642.

25. A method according to claim 22, wherein dissolution of said carbonate-containing rock formation buffers a mixture of said *T. denitrificans,* said aqueous liquid carrier, and said non-oxygen electron accepter at a pH of approximately 6.5.

26. A method according to claim 1, further comprising the step of introducing into said rock formation a phosphate compound in an amount sufficient to satisfy a nutritional phosphate requirement for said microorganisms.

27. A method according to claim 1, wherein flood water serves as said aqueous liquid carrier.

28. A method according to claim 1, wherein said step of introducing comprises injecting, into said rock formation, a composition containing said microorganisms, said non-oxygen electron accepter, and said aqueous liquid carrier separately from injecting flood water into said rock formation.

29. A method according to claim 1, wherein said carbonate-containing rock formation is a limestone formation.

30. A method according to claim 1, wherein said carbonate-containing rock formation is a mixed limestone-sandstone formation.

31. A method according to claim 1, wherein said carbonate-containing rock formation is a shale-limestone formation.

32. A method according to claim 1, further comprising the step of introducing, into said rock formation, metal nutrients in amounts sufficient to satisfy metal nutrient requirements for said microorganisms.

33. A method according to claim 1, further comprising the step of introducing a nitrogen source into said rock formation.

34. A method according to claim 1, further comprising the step of introducing ammonium nitrate into said rock formation as said non-oxygen electron accepter and as a source of nitrogen.

35. A method according to claim 1, wherein reduction of said non-oxygen electron accepter produces nitrogen gas which pressurizes oil in said rock formation, said pressurization assisting removal of said oil from said rock formation.

36. A method according to claim 1, wherein said carbonate is in chemical equilibrium with carbon dioxide and wherein said microorganisms remove said carbon dioxide to effect further dissolution of carbonate, maintaining said chemical equilibrium.

* * * * *